July 3, 1928. 1,675,990

M. J. PAYNE

TIRE VALVE

Filed Aug. 16, 1920

Inventor,
Marshall J. Payne
by Chas. J. Williamson
Atty.

Patented July 3, 1928.

1,675,990

UNITED STATES PATENT OFFICE.

MARSHALL J. PAYNE, OF STAUNTON, VIRGINIA, ASSIGNOR TO THE PAYNE VALVE CORPORATION, OF STAUNTON, VIRGINIA.

TIRE VALVE.

Application filed August 16, 1920. Serial No. 403,794.

My invention relates to valves for pneumatic tires, and particularly to attaching the valve stem to the tire, my main object being to provide means to secure a more perfectly air-tight connection between stem and tire. than has been heretofore effected. My invention consists in the construction defined by or included within the terms of the appended claims.

Figure 1:
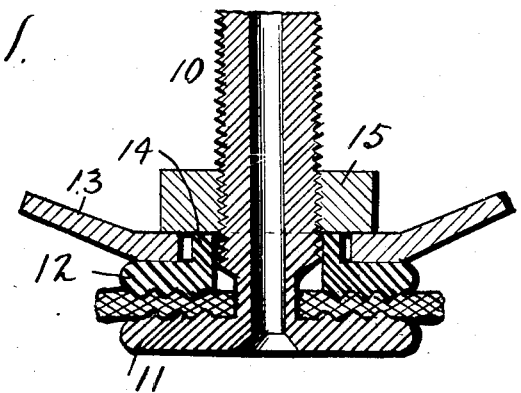
Fig. 1 is a longitudinal section of enough of a tire valve to illustrate an embodiment of my invention.

In the accepted construction the valve stem 10 has, at its end within the tire tube, a flange or head 11, with its surface next the tube provided with concentric ridges or grooves, and on the outer side of the tube is a washer 12 with similar grooves, the wall of the tube being clamped between these ridged and grooved faces. Obviously, if the ridges on one face come opposite the grooves on the other, the tire wall will be so effectually pinched by them that a highly efficient joint against air leakage will result, and by my invention, about to be explained, I get that desirable result. As ordinarily constructed, the washer 12 is rigidly fixed to the bent wing or piece 13 and usually the connection is by means of a thimble 14 that fits a hole in said piece, the interior of the thimble being flattened to engage flat faces on the tire stem. I retain the piece 13 and the washer thimble, but make the connection between them loose, and fit the washer thimble close to the valve stem, so that concentric alinement of ridges and grooves of washer face and stem head may be maintained and yet some sidewise play of the piece 13 be permitted so that such alinement is not disturbed. The exterior of the thimble and the interior of the hole therefor in piece 13, are correspondingly flattened so that piece 13 cannot turn on the stem.

Figure 2:
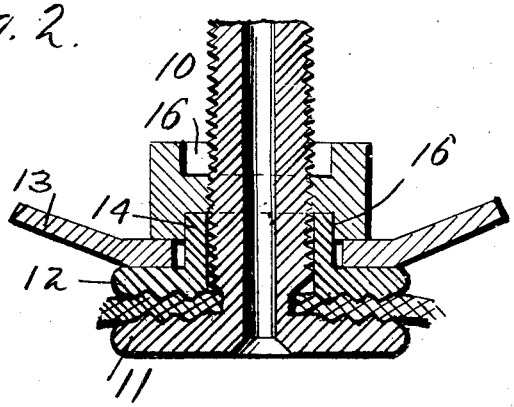
Fig. 2 is a like view of another embodiment.
Figure 3:
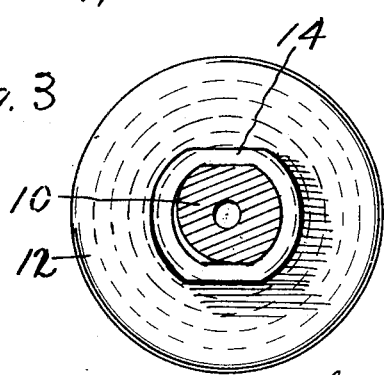
Fig. 3 is a detail top-plan of the clamping washer the tire stem being shown in section.

The clamping nut 15 engaging the thread on the tire stem, engages the outer end of the thimble 14, which may be flush with the outer face of the piece 13, as shown in Fig. 1; or as seen in Fig. 2, the outer end of the thimble may reach beyond the piece 13, in which case the nut has an annular recess 16 that receives the thimble end and enables the nut to reach to and engage the piece 13. Preferably to enable either side of the nut to be the thimble engaging side, both sides thereof are formed with the recess.

I claim,

1. The combination of a valve stem, having a head within the tire, a washer on the stem outside the tire, the head and washer having complementary ridged and grooved, opposing surfaces, means to clamp the tire between such surfaces, means to maintain the alinement of the ridges and grooves of head and washer, a wing piece having a hole, and a thimble on the washer fitting loosely in the said hole the wing piece being free to move laterally of the thimble.

2. The combination of a valve stem, having a head within the tire, a washer on the stem outside the tire, the head and washer having complementary ridged and grooved, opposing surfaces, means to clamp the tire between such surfaces, means to maintain the alinement of the ridges and grooves of head and washer, a wing piece having a hole, a thimble on the washer fitting loosely in the said hole, the wing piece being free to move laterally of the thimble and a clamping nut on the stem recessed to receive the outer end of the thimble.

3. The combination of a valve stem, having a head within the tire, a washer on the stem outside the tire, the head and washer having complementary ridged and grooved, opposing surfaces, means to clamp the tire between such surfaces, means to maintain the alinement of the ridges and grooves of head and washer, a wing having a hole, a thimble on the washer fitting loosely in the said hole, the wing piece being free to move laterally of the thimble and a clamping nut on the stem recessed to receive the outer end of the thimble on both sides.

In testimony whereof I hereunto affix my signature.

MARSHALL J. PAYNE.